(12) United States Patent
McBride

(10) Patent No.: US 7,417,962 B2
(45) Date of Patent: Aug. 26, 2008

(54) QOS CAPABLE MOBILE AD-HOC NETWORK DEVICE

(75) Inventor: Brian McBride, Stittsville (CA)

(73) Assignee: ALCATEL Lucent, Paris (FR)

( * ) Notice: Subject to any disclaimer, the term of this patent is extended or adjusted under 35 U.S.C. 154(b) by 554 days.

(21) Appl. No.: 10/940,752

(22) Filed: Sep. 15, 2004

(65) Prior Publication Data
US 2006/0056353 A1    Mar. 16, 2006

(51) Int. Cl.
H04B 7/00 (2006.01)
H04L 1/00 (2006.01)
H04L 12/26 (2006.01)
H04L 12/28 (2006.01)
H04L 12/66 (2006.01)
H04L 12/56 (2006.01)

(52) U.S. Cl. .......... 370/310; 370/235; 370/238; 370/252; 370/254; 370/351; 370/352; 370/389; 370/395.4; 370/417

(58) Field of Classification Search .......... 370/235, 370/238, 252, 254, 351, 352, 389, 395.4, 370/417, 310
See application file for complete search history.

(56) References Cited

U.S. PATENT DOCUMENTS

| | | | | |
|---|---|---|---|---|
| 6,389,031 B1* | 5/2002 | Chao et al. | | 370/412 |
| 6,894,991 B2* | 5/2005 | Ayyagari et al. | | 370/325 |
| 7,126,949 B2* | 10/2006 | Tingle et al. | | 370/392 |
| 2002/0199021 A1* | 12/2002 | Beier | | 709/246 |
| 2003/0058871 A1 | 3/2003 | Sastry et al. | | |
| 2003/0156538 A1 | 8/2003 | Lebizay et al. | | |
| 2006/0143300 A1* | 6/2006 | See et al. | | 709/227 |
| 2007/0019676 A1* | 1/2007 | Kompella | | 370/468 |
| 2007/0050773 A1* | 3/2007 | Tayyar et al. | | 718/102 |

FOREIGN PATENT DOCUMENTS

EP    1 124 356    8/2001

OTHER PUBLICATIONS

Mohapatra, Prasant, et al., Group Communications in Mobile Ad Hod Networks, pp. 52-59, IEEE Computer Society, Feb. 2004.
Monet Research Group, Mobile Ad Hod Network Research, http://cairo.cs.uiuc.edu/adhoc, Sep. 2, 2004.

* cited by examiner

*Primary Examiner*—Lester Kincaid
*Assistant Examiner*—Nathan Mitchell

(57) ABSTRACT

The ad-hoc router enables a decentralized IP routing network (mobile of fixed) amongst a set of network devices, and can offer quality of services for voice, video and data applications. The ad-hoc router is divided into a receiving, control/management processing, IP datapath/routing, randomizer, scheduler and transmission blocks. The IP datapath/routing block provides, in addition to the standard datapath routing functionality, per packet labels that uniquely identify the source device of the packet in the network. The scheduler maintains a plurality of QoS queues, which are then dequeued with a WFQ scheduler, which can be based on standard technology or a simplified low-cost implementation. The randomizer uses the labels to route the packets to a queue such that all packets from the source device, indicated by the label, enter the same queue. For greater security, the randomizer uses a random mapping function that is re-computed periodically.

11 Claims, 2 Drawing Sheets

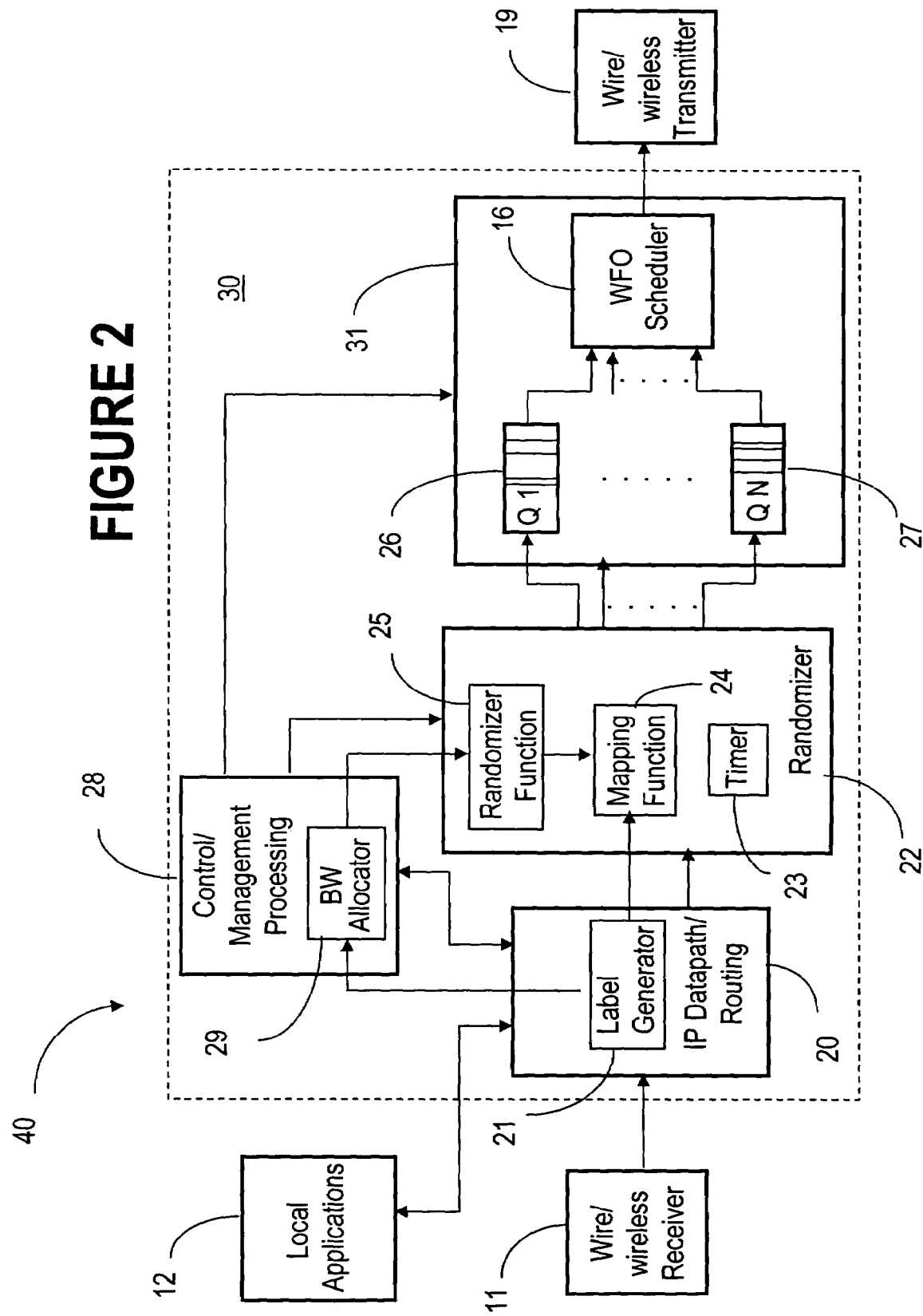

QOS CAPABLE MOBILE AD-HOC NETWORK DEVICE

FIELD OF THE INVENTION

The invention is directed to the communication networks and in particular to a QoS capable mobile ad-hoc network device.

BACKGROUND OF THE INVENTION

There is significant industry research and development in the area of ad-hoc networking. The term "ad-hoc" (or "spontaneous") has been applied to networks that are formed and deformed on-the-fly, without the need for system administration. An ad-hoc network is essentially infrastructure-less since there is no need for fixed base station, wires, or routers in the network. Ad-hoc network technology for example may allow people to come to a conference room and, using infrared transmission or radio frequency (RF) wireless signals, join their notebook computers or PDAs (personal digital assistant) with other conferees to a local network with shared data and printing resources. In another application, a user's ad-hoc device may communicate with home wireless devices to unlock doors, activate lights and home audio and video equipment units, adjust heating and cooling settings, and the like.

Ad-hoc networks can be mobile, standalone, or/and networked with other networks such as wide area networks or the Internet. A mobile ad-hoc network is a self-configuring network of mobile routers, connected by wireless links. Mobile ad-hoc devices are able to detect the presence of other ad-hoc devices, establish communication links with the other devices, and communicate information such as packetized digital data. Since the devices move randomly, the network topology is rapidly and unpredictably changing, so that the devices often have different views of the network, both in time (information may be outdated at some nodes but current at others) and in space (a node may only know the network topology in its neighborhood).

Due to the lack of a fixed infrastructure, nodes must self-organize and reconfigure as they move, join or leave the network. All nodes could potentially be functionally identical and there may not be any natural hierarchy or central controller in the network; many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes (multihop technology) before reaching its destination.

Quality-of-service (QoS) routing in mobile ad hoc networks is gaining interest. To provide QoS, the protocol needs not only to find a route but also to secure the resources along the route. Because of the limited, shared bandwidth of the network, and lack of central controller which can account for and control these limited resources, nodes must negotiate with each other to manage the resources required for QoS routes. This is further complicated by frequent topology changes. Due to these constraints, QoS routing is more demanding than best-effort routing.

The use of wireless LANs is expected to increase dramatically in the future as businesses discover the enhanced productivity and the increased mobility that wireless communications can provide. New applications for mobile ad-hoc networks will continue to emerge and become an important part of the communication structure. One wireless networking protocol of significant importance due in part to its growing use in devices such as palmtop computers, personal digital assistants (PDAs), laptop computers, and Internet mobile phones is IEEE 802.11. The Mobile Ad-Hoc Networks (MANET) working group of the Internet Engineering Task Force (IETF) has been actively evaluating and standardizing routing, including multicasting, protocols.

Although 802.11 provides a reliable means of wireless data transfer, the 802.11 standard does not support QoS traffic delivery in its MAC layer. There is an 802.11 Task Group e (TGe) joint proposal to support QoS enhancements. Virtual streams having QoS parameter values including priority, data rate, delay bounds and jitter bounds, are supported. The proposal uses a point coordinator (PC) function, featuring reservation request procedures to request new bandwidth allocations. Several new data and management frames are used. New acknowledgement policies, direct station-to-station transfers, basic service set (BSS) overlap management, and dynamic wireless repeater functions are included. However, this proposal requires modification of the existing 802.11 standard, and may not support, or be supported by, legacy 802.11 devices.

Prior art is centered around the routing and signaling issues, as opposed to the datapath issues. There is no known solution to the QoS problem in mobile ad-hoc networks, and there is a need to address this problem as the use of mobile networks increases. The present invention relates to a low cost mobile ad-hoc networking device which provides a decentralized IP routing network amongst a set of mobile devices within the communication range, and can offer QoS for voice, video and data applications. The basic technology can also be applied to large scale fixed IP networks of low cost simple devices.

SUMMARY OF THE INVENTION

It is an object of the invention to provide a quality of service (QoS) capable mobile ad-hoc network device that alleviates totally or in part the drawbacks of the prior art mobile ad-hoc network devices.

It is another object of the invention to provide a low cost mobile ad-hoc networking device which enables a decentralized IP routing network amongst a set of mobile devices within communication range, and which can offer QoS for voice, video and data applications. The basic technology can also be applied to large scale fixed IP networks of low cost simple devices.

Accordingly, the invention provides a A QoS-capable device for connection over an ad-hoc network, for enabling QoS at the network datapath level, comprising: means for calculating the next hop for each PDU while attaching a label to each PDU; means for mapping the label to a respective source device; means for scheduling transmission of the PDU according to the respective source device, and for determining the transmission order of the PDUs using a scheduling model; and processing means for controlling and managing operation of the QoS-capable device, to enable a fair distribution of network bandwidth among the source devices.

According to another aspect of the invention, a method for securely providing quality of service (QoS) based scheduling to protocol data units (PDUs) at a network router in an ad-hoc network. The method comprises the steps of: a) calculating the next hop for each PDU while attaching a label to each PDU; b) mapping the label to a respective source device; c) queuing the PDU according to the respective source device, and determining the transmission order of the PDUs using a scheduling model; and d) controlling transmission of the PDU from the network router to enable a fair distribution of network bandwidth among the source devices.

Still further, the invention provides a system for providing quality of service (QoS) based scheduling to packet data flows from source devices in a communication network, comprising: a plurality of queues, each queue corresponding to a QoS level and for queuing packets accordingly; a weighted fair queueing (WFQ) scheduler for scheduling queued packets; means for generating labels on a per packet basis and affixing labels to packets, wherein each label uniquely identifies a source device; means for mapping labels to queues according to a respective random function for each label; and means for routing packets to queues according to the mapping.

Advantageously, the solution according to the invention is resilient enough to block malicious devices, because the fairness is distributed amongst all devices. A single device abusing the network will be bandwidth controlled by its neighbor devices because of the queuing structure. The abusing node does not know the neighbors randomizing function and therefore it is not capable of pre-computing the destination queues to abuse the network.

As well, this solution offers QoS at the network datapath level; therefore it is not subject to malicious or faulty devices that do not participate in the routing and management functions correctly, either by design or due to failure.

Still further, this solution is resilient enough to withstand a rapidly changing network; even with each node or multiple nodes leaving the network or failing periodically. For military mobile communications this is important because a multitude of devices may be destroyed and the network must stay functional as long as possible. For low power mobile wireless this is important since nodes may come and go from the network in order to conserve battery consumption.

Another advantage of this solution is that is logically simple and can be implemented on a single low-power integrated circuit.

BRIEF DESCRIPTION OF THE DRAWINGS

The foregoing and other objects, features and advantages of the invention will be apparent from the following more particular description of the preferred embodiments, as illustrated in the appended drawings, where:

FIG. 2 illustrates a QoS capable mobile ad-hoc router according to an embodiment of the invention.

DETAILED DESCRIPTION

Figure 1A:
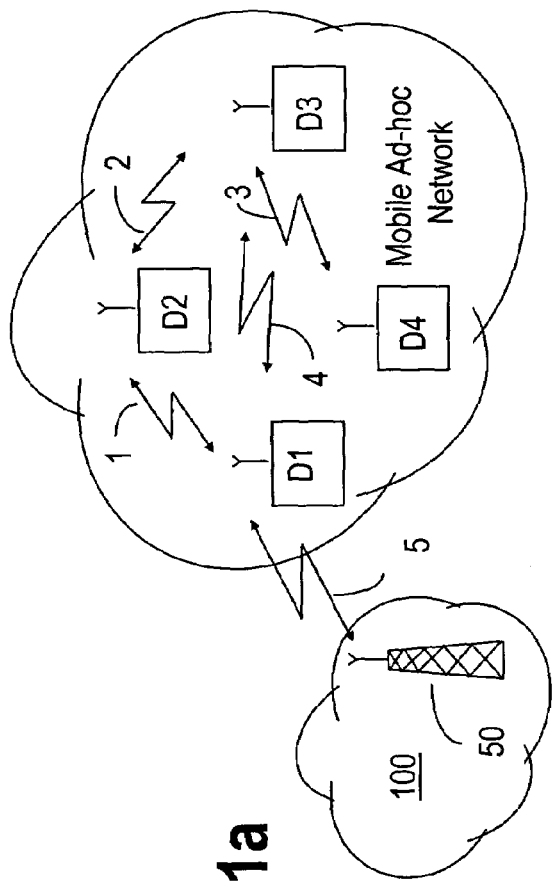
FIG. 1a shows an example of a mobile ad-hoc network.

FIG. 1a illustrates an example of a mobile ad-hoc network established between mobile devices D1-D4. Devices D1-D4 are mobile ad-hoc routers in this example, which can automatically recognize the presence of, and communicate with other compatible ad-hoc wireless devices, employing a certain packet routing method. Each additional device joining the network is also able to send and receive signals. Although it may seem that order would be difficult to maintain in this type of network, algorithms for routing the traffic at each device are readily available. For example, one mechanism elects one a device as the base, or master, station of the network, with the others devices being "slaves." Another algorithm in ad-hoc network architectures uses a broadcast and flooding method to all other nodes to establish the identity of all nodes in the network.

Although FIG. 1a shows the devices as being mobile and communicating over wireless links 1-4, wireline devices may also be temporarily connected to an ad-hoc network (not shown). Often, the ad-hoc network enables communication to land lines or to wireless/cellular networks, using fixed access points (AP). This type of architecture expands the services provided to the customers by enabling communication with wired/wireless nodes of other networks. For example, FIG. 1 shows a base station 50 that connects the mobile ad-hoc network with a wireless LAN 100 for enabling mobile devices D1-D4 to communicate with customers of the LAN, or to access the Internet. If service areas overlap, handoffs may occur between wireless LANs. This structure is very similar to that used in cellular networks. It is to be re-emphasized that base station 50 is not necessary for operation of the ad-hoc network.

Figure 1B:
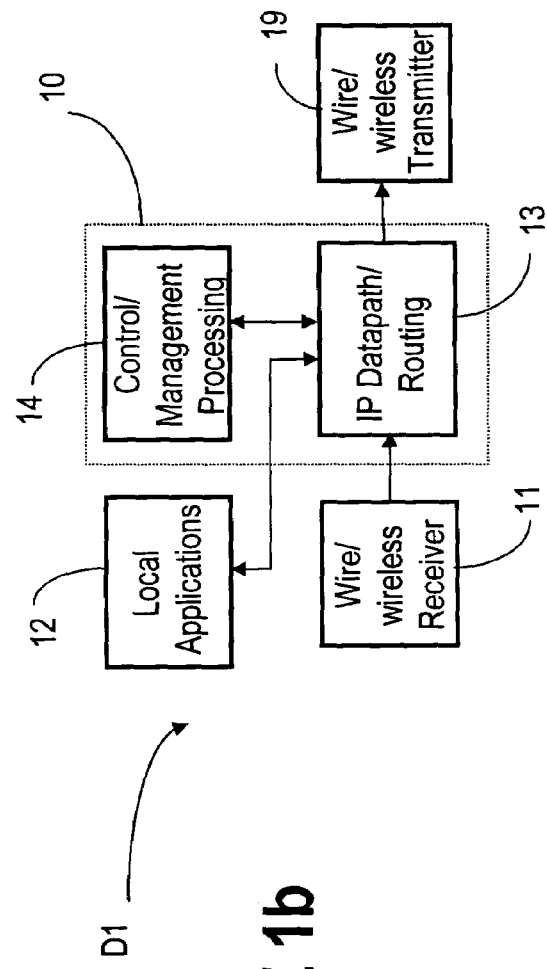
FIG. 1b shows a prior art mobile ad-hoc router.

FIG. 1b illustrates the block diagram of a device, let's say device D1, as used in the current ad-hoc networks. Each device includes transceiver means for enabling the user to receive and transmit signals. For example, receiver 11 could be a wireless receiver, if the device D1 is a mobile router or a wireline receiver if device D1 is a wireline router. Similarly, the transceiver includes a wireless or wireline transmitter 19. The receiver 11 gathers and decodes data from either a wired or wireless interface using standard technology. Likewise, the transmitter 19 gathers and encodes data for transmission on a wired or wireless interface.

The router 10 provides the standard IP datapath and routing functions of a mobile ad-hoc network. The IP datapath/routing 13 provides functionality such as packet next-hop calculation, and control/management processing 14, provides the signaling and maintenance of the routing lookup table information.

The local applications unit 12 may for example consist of an analog to digital voice function, TCP/UDP and higher applications and/or video digitization.

As indicated above, the IEEE Standard 802.11 (1999) designed for wireless local area networks (WLAN) and used in mobile ad-hoc networks, does not support QoS traffic delivery in the MAC layer. That is to say, different qualities of service QoS are required particularly in relation to the multimedia communications. In order to provide QoS traffic delivery, the transmission routes should be properly controlled according to their properties. FIG. 2 illustrates a QoS capable mobile ad-hoc router according to an embodiment of the invention.

The QoS capable mobile ad-hoc network device 40 of FIG. 2 comprises a wireless/wireline receiver 11 and a wireless/wireline transmitter 19, with a similar functionality as that of the device D1 of FIG. 1B. As well, device 40 comprises a local applications unit 12 for implementing analog to digital voice function, TCP/UDP and higher applications and/or video digitization.

The routing part denoted here with 30 includes an IP datapath/routing 20, a control/management processing unit 28, a randomizer 22 and a scheduler 31.

The IP datapath and routing function 20 provides the standard IP datapath and routing functions of a mobile ad-hoc network with the exception that it computes, per packet, labels that uniquely identify the source device of the packet in the network. This is shown by the label generator 21. The randomizer 22 uses these labels to route the packets from this device to a queue Qi of a plurality of queues Q1-QN, such that all packets from a source device, as indicated by the label, enter the same queue 26 . . . 27.

However, for greater security, the randomizer 22 routes the packets to the appropriate queue in a manner that is not detectable by the source device. To this end, it uses a mapping function block 24 that computes a random mapping function at power up. Furthermore, the randomizer re-computes the function periodically, as shown by the timer 23, when the device is in operation.

The queues 26, 27 are then de-queued with a WFQ scheduler 16, which can be based as before on standard technology. Alternatively, a simplified low-cost implementation may be used for scheduler 16.

The control/management processing 28 is as before a standard unit required for a mobile ad-hoc network for routing and device management. In the embodiment of the invention shown in FIG. 2, unit 28 is provided with the capability of monitoring and changing the randomizer function 25 via labels to control the amount of bandwidth allocated to different service classes. This is generically shown by the bandwidth allocator unit 29, which receives the labels form the label generator block 21 and modifies accordingly the randomizer function 25.

To summarize, device 40 according to the invention uses the label generator 21, randomizer 22, queues 26, 27 and scheduler 31 in combination to achieve QoS in the whole network. This mechanism provides the ability for each node to have fair access to the network resources without the ability to abuse the network, because source nodes can not determine in advance, from which queue they will be served at each node. Nodal QoS can be achieved via the application and management layers controlling which packets go to which queues and how the WFQ scheduler is weighted per service class.

I claim:

1. A QoS-capable device for connection over an ad-hoc network, for enabling QoS at the network datapath level, comprising;
   means for calculating the next hop for each protocol data unit (PDU) while attaching a label to each PDU;
   means for mapping the label to a respective source device;
   means for scheduling transmission of the PDU according to the respective source device, and for determining the transmission order of the PDUs using a scheduling model; and processing means for controlling and managing operation of the QoS-capable device, to enable a fair distribution of network bandwidth among the source devices, wherein
   the means for scheduling comprises:
      a plurality of QoS queues, a particular queue including exclusively PDUs arrived to the QoS-capable device from the same source device; and
      a scheduler for determining the transmission order of the PDUs using a scheduling model, to enable specific QoS for each source device, and the means for mapping comprises:
      a randomizer for computing a random mapping function in order to disable a malicious source device from abusing the network; and
      a mapping function block for mapping the label to the respective source device.

2. The QoS-capable device of claim 1, wherein the means for calculating comprises;
   routing means for identifying an output port for each PDU based on the address of a respective destination device; and
   a label generator for generating a label for each PDU, the label uniquely identifying the respective source device that generated each PDU.

3. The QoS-capable device of claim 1, wherein said scheduling model is based on a weighted fair queuing (WFQ) scheme.

4. The QoS-capable device of claim 1, wherein the means for mapping further comprises a timer for triggering change of said random mapping function at preset intervals.

5. The QoS-capable device of claim 1, further comprising a transceiver for enabling reception of the PDU from the respective source device and transmission of the PDU to a destination device in the ad-hoc network.

6. The QoS-capable device of claim 1, wherein the ad-hoc network is a mobile ad-hoc network and the transceiver is a wireless transceiver.

7. A method for securely providing quality of service (QoS) based scheduling to PDUs at a network router in an ad-hoc network, comprising the steps of:
   a) calculating the next hop for each PDU while attaching a label to each PDU;
   b) mapping the label to a respective source device;
   c) queuing the PDU according to the respective source device, and determining the transmission order of the PDUs using a scheduling model; and
d) controlling transmission of the PDU from the network muter to enable a fair distribution of network bandwidth among the source devices, wherein
   step c) comprises:
      providing a plurality of QoS queues, a particular queue including exclusively PDUs arrived to the QoS-capable device from the same source device; and
      determining the transmission order of the PDUs using a scheduling model, to enable specific QoS for each source device, and
   step b) comprises:
      computing a random mapping function in order to disable a malicious source device from abusing the network; and
      mapping the label to the respective source device.

8. The method of claim 7, wherein step a) comprises;
   identifying on output port for each PDU based on the address of a respective destination device; and
   generating a label for each PDU, the label uniquely identifying the respective source device that generated each PDU.

9. The method of claim 7, wherein said scheduling model is based on a weighted fair queuing (WFQ) scheme.

10. The method of claim 7, wherein step b) further comprises triggering change of said random mapping function at preset intervals.

11. A system for providing quality of service (QoS) based scheduling to packet data flows from source devices in a communication network, comprising:
   a plurality of queues, each queue corresponding to a QoS level and for queuing packets accordingly;
   a weighted fair queueing (WFQ) scheduler for scheduling queued packets;
   means for generating labels on a per packet basis and affixing labels to packets, wherein each label uniquely identities a source device;
   means for mapping labels to queues according to a respective random function for each label; and
   means for routing packets to queues according to the mapping.

* * * * *